(12) United States Patent
Lipczynski et al.

(10) Patent No.: US 9,643,260 B2
(45) Date of Patent: May 9, 2017

(54) SYSTEMS AND METHODS FOR FORMING AN OPENING IN A STACK

(71) Applicant: The Boeing Company, Chicago, IL (US)

(72) Inventors: Gary Lipczynski, Garden Grove, CA (US); Wesley E. Holleman, Long Beach, CA (US); Eric Whinnem, Whittier, CA (US); William P. Zanteson, Monrovia, CA (US)

(73) Assignee: THE BOEING COMPANY, Chicago, IL (US)

( * ) Notice: Subject to any disclaimer, the term of this patent is extended or adjusted under 35 U.S.C. 154(b) by 199 days.

(21) Appl. No.: 14/160,982

(22) Filed: Jan. 22, 2014

(65) Prior Publication Data

US 2015/0202696 A1    Jul. 23, 2015

(51) Int. Cl.
*B23B 51/00* (2006.01)
*B23C 3/02* (2006.01)
(Continued)

(52) U.S. Cl.
CPC ........ *B23B 51/009* (2013.01); *B23B 51/0018* (2013.01); *B23C 3/02* (2013.01);
(Continued)

(58) Field of Classification Search
CPC ....... B23B 35/00; B23B 41/16; B23B 51/009; B23B 51/02; B23B 2215/04;
(Continued)

(56) References Cited

U.S. PATENT DOCUMENTS 2,786,373 A * 3/1957 Patton .................. B23B 51/009
                                                   408/223
3,309,772 A * 3/1967 Lieb ........................ A61C 3/02
                                                   433/166
(Continued)

FOREIGN PATENT DOCUMENTS

| CN | 101600529 | 12/2009 |
|----|-----------|---------|
| CN | 102649175 | 8/2012  |
| EP | 2599569   | 5/2013  |

OTHER PUBLICATIONS

The State Intellectual Property Office of the People's Republic of China Office Action dated Aug. 1, 2016.
(Continued)

*Primary Examiner* — Daniel Howell
*Assistant Examiner* — Yasir Diab
(74) *Attorney, Agent, or Firm* — Joseph F. Harding; The Small Patent Law Group LLC.

(57) ABSTRACT

One aspect of the disclosure relates to a cutting tool for forming a final opening in a stack that includes at least two layers and a pilot opening having a pilot-opening dimension and extending through at least one of the at least two layers. The cutting tool includes a shank. The cutting tool also includes a first portion including at least one of a first coating or the first coating and a second coating, wherein the first coating at least partially covers the first portion. The cutting tool also includes a second portion between the shank and the first portion, wherein the second portion includes the second coating, and wherein the second coating at least partially covers the second portion.

20 Claims, 8 Drawing Sheets

(51) Int. Cl.
  *B23C 5/10* (2006.01)
  *B23B 35/00* (2006.01)

(52) U.S. Cl.
  CPC ............... *B23C 5/10* (2013.01); *B23B 35/00* (2013.01); *B23B 2215/04* (2013.01); *B23B 2222/61* (2013.01); *B23B 2224/00* (2013.01); *B23B 2224/08* (2013.01); *B23B 2226/27* (2013.01); *B23B 2226/275* (2013.01); *B23B 2226/31* (2013.01); *B23B 2226/315* (2013.01); *B23B 2251/245* (2013.01); *B23B 2251/42* (2013.01); *B23C 2220/52* (2013.01); *B23C 2222/84* (2013.01); *B23C 2224/14* (2013.01); *B23C 2226/27* (2013.01); *B23C 2226/31* (2013.01); *B23C 2228/04* (2013.01); *B23C 2228/08* (2013.01); *B23C 2228/10* (2013.01); *Y10T 408/03* (2015.01); *Y10T 408/78* (2015.01); *Y10T 408/81* (2015.01); *Y10T 408/89* (2015.01); *Y10T 408/906* (2015.01)

(58) Field of Classification Search
  CPC ............ B23B 2222/44; B23B 2222/61; B23B 2224/08; B23B 2226/27; B23B 2226/275; B23B 2226/31; B23B 2226/315; B23B 2251/18; B23B 2251/245; B23B 2251/60; B23C 2210/03; B23C 2210/247; B23C 2215/04; B23C 2220/52; B23C 2224/14; B23C 2226/27; Y10T 408/81; Y10T 408/78; Y10T 408/906; Y10T 407/27
  See application file for complete search history.

(56) References Cited

U.S. PATENT DOCUMENTS

| | | | | |
|---|---|---|---|---|
| 5,000,630 A | * | 3/1991 | Riley | ............... B23B 51/00 407/1 |
| 5,197,233 A | * | 3/1993 | Wiand | ............... B24B 13/01 407/32 |
| 5,354,155 A | | 10/1994 | Adams | |
| 5,879,823 A | | 3/1999 | Prizzi et al. | |
| 6,007,281 A | * | 12/1999 | Eriksson | ............... B23B 35/00 408/1 R |
| 6,447,890 B1 | | 9/2002 | Leverenz et al. | |
| 6,773,211 B2 | * | 8/2004 | Zackrisson | ............... B23B 51/10 407/53 |
| 6,913,425 B1 | * | 7/2005 | Strobel | ............... B21D 37/205 407/53 |
| 7,217,466 B2 | * | 5/2007 | Weber | ............... C23C 28/044 428/697 |
| 7,431,538 B1 | * | 10/2008 | Ni | ............... B23C 5/10 407/53 |
| 7,627,940 B2 | | 12/2009 | Amirehteshami et al. | |
| 7,713,612 B2 | * | 5/2010 | Hanyu | ............... B23C 5/1009 428/216 |
| 7,901,796 B2 | * | 3/2011 | Fukui | ............... B23P 15/28 204/192.1 |
| 8,057,137 B2 | | 11/2011 | Lipczynski et al. | |
| 8,119,227 B2 | | 2/2012 | Reineck et al. | |
| 8,202,141 B2 | * | 6/2012 | Le Borgne | ............... B24D 7/00 451/450 |
| 8,342,780 B2 | * | 1/2013 | Garrick | ............... B23B 51/02 407/118 |
| 8,623,525 B2 | | 1/2014 | Waki et al. | |
| 2002/0132141 A1 | | 9/2002 | Toihara | |
| 2007/0274790 A1 | * | 11/2007 | Maurer | ............... B23C 5/1081 407/34 |
| 2008/0193234 A1 | | 8/2008 | Davancens | |
| 2012/0051863 A1 | | 3/2012 | Craig | |
| 2012/0219371 A1 | | 8/2012 | Craig | |
| 2013/0121778 A1 | | 5/2013 | Kauper | |
| 2013/0307178 A1 | | 11/2013 | Kress | |

OTHER PUBLICATIONS

Extended European Search Report for 14198374.2-1709, dated Jun. 25, 2015.

* cited by examiner

SYSTEMS AND METHODS FOR FORMING AN OPENING IN A STACK

BACKGROUND

Certain products, for example, aircraft or aircraft assemblies, may include components of different material types. The presence of different materials in layers of a stack through which a cutting tool is used to form an opening (e.g., drill a hole), may complicate the drilling process and result in high costs for tools and processes to complete the drilling prior to assembly. Different tools or different tool coatings may be required to efficiently and/or cost-effectively drill through the different layers. For example, bare carbide tools generally wear relatively quickly when used to drill carbon fiber reinforced plastic (CFRP). Tools with diamond coatings may be used to improve wear characteristics for drilling CFRP, but diamond coatings chemically react with the iron in steel layers, rendering diamond coatings inappropriate for use with steel.

SUMMARY

Accordingly, a cutting tool for forming openings in a stack having multiple layers, intended to address the above-identified concerns, would find utility.

One example of the present disclosure relates to a cutting tool for forming a final opening in a stack that includes at least two layers and a pilot opening having a pilot-opening dimension and extending through at least one of the at least two layers. The cutting tool includes a shank. The cutting tool also includes a first portion including at least one of a first coating or the first coating and a second coating, wherein the first coating at least partially covers the first portion. The cutting tool also includes a second portion between the shank and the first portion, wherein the second portion includes the second coating, and wherein the second coating at least partially covers the second portion.

One example of the present disclosure relates to a method of processing a stack that includes at least two layers. The method includes providing a cutting tool including a shank; a first portion including at least one of a first coating or the first coating and a second coating, wherein the first coating at least partially covers the first portion; a second portion between the shank and the first portion, wherein the shank, the first portion, and the second portion have a longitudinal symmetry axis, wherein the second portion includes the second coating, and wherein the second coating at least partially covers the second portion. The method also includes rotating the cutting tool about the longitudinal symmetry axis and urging the cutting tool through the stack to form a final opening having a final-opening diameter and extending through the at least two layers, wherein the first portion is smaller than a pilot opening having a pilot-opening dimension and extending through at least one of the at least two layers, the final-opening diameter is substantially equal to or larger than the pilot-opening dimension, and the final opening is substantially coaxial with the pilot opening.

BRIEF DESCRIPTION OF THE DRAWINGS

Having thus described examples of the disclosure in general terms, reference will now be made to the accompanying drawings, which are not necessarily drawn to scale, and wherein like reference characters designate the same or similar parts throughout the several views, and wherein:

In the block diagram(s) referred to above, solid lines connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagram(s) may also exist. Dashed lines, if any, connecting the various elements and/or components represent couplings similar in function and purpose to those represented by solid lines; however, couplings represented by the dashed lines are either selectively provided or relate to alternative or optional aspects of the disclosure. Likewise, any elements and/or components, represented with dashed lines, indicate alternative or optional aspects of the disclosure. Environmental elements, if any, are represented with dotted lines.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with the specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Figure 1:
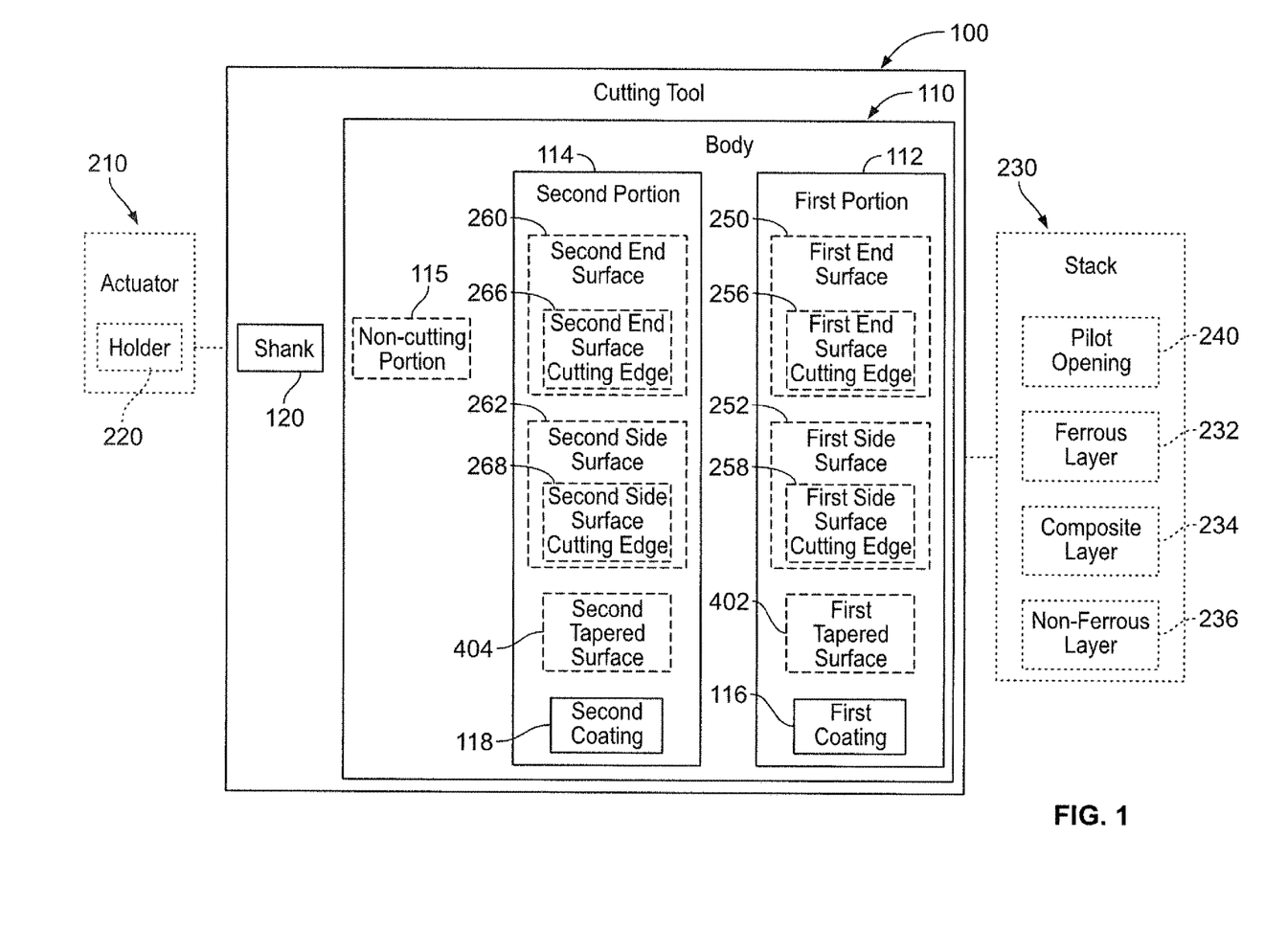
FIG. 1 is a block illustration of a cutting tool, according to one aspect of the disclosure.
Figure 2:
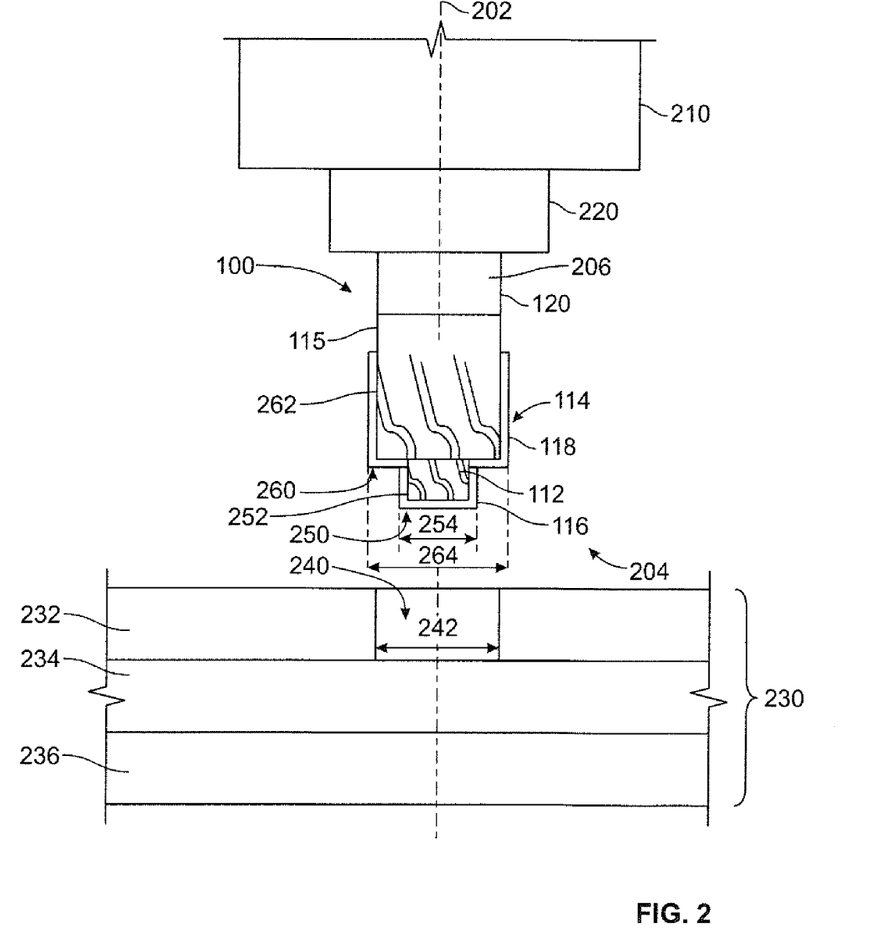
FIG. 2 is a schematic sectional view of the cutting tool of FIG. 1 and of a stack of parts to be drilled by the cutting tool, according to one aspect of the disclosure.

As illustrated in FIGS. 1-12, and with particular reference to FIG. 2, one example of the present disclosure relates to a cutting tool 100 for forming a final opening 1104 (FIG. 11d) in a stack 230 that includes at least two layers (e.g., a ferrous layer 232 and a composite layer 234) and a pilot opening 240 having a pilot-opening dimension 242 and extending through at least one of the at least two layers (e.g., the ferrous layer 232). The cutting tool 100 includes a shank 120. The cutting tool 100 also includes a first portion 112 including at least one of a first coating 116 or the first coating 116 and a second coating 118, wherein the first coating 116 at least partially covers the first portion 112. The cutting tool 100 also includes a second portion 114 between the shank 120 and the first portion 112, wherein the second portion 114 includes the second coating 118, and wherein the second coating 118 at least partially covers the second portion 114. The pilot-opening dimension 242 may be a diameter. As used herein, unless otherwise specified, the terms "first," "second," and "third," etc. are used merely as labels, and are not intended to impose ordinal or positional requirements on the elements to which these terms pertain. For example, a "first" and "second" object need not be positioned adjacent to each other or in a particular order with respect to each other or other objects merely by virtue of being labeled "first" and "second." Moreover, the use of a "first" and "second" object does not necessarily require or preclude the use of a "third" object, "fourth" object, and so on.

With continued reference to FIG. 2, the first portion 112 and second portion 114 may be configured as or include cutting portions used to remove material from one or more layers of the stack 230. For example, the first portion 112 and/or the second portion 114 may include one or more of teeth, flutes or channels configured for material removal, or the like. Generally, the first portion 112 and the second portion 114 are configured to be rotated about a longitudinal symmetry axis 202 of the cutting tool 100 and urged through the stack 230 to remove material from the stack 230. "Rotation" as used herein, occurs when the rotational axis of a body passes through the center of mass of the body, whereby the body rotates upon itself or spins. In some examples, in addition to rotation, the cutting tool 100 may also be moved in an orbital motion. The cutting tool 100, in various examples, may be configured for use in axial drilling and/or orbital drilling. Alternatively or additionally, the cutting tool 100 may be configured for use with additional or other operations. In one example, the cutting tool 100 may be employed for reaming. The shank 120 is sized and configured to provide a surface for securing the cutting tool 100 to an actuator 210 used to rotate or rotate and orbit the cutting tool 100 and urge the cutting tool 100 into the stack 230. In the example depicted in FIG. 2, the shank 120 is used to secure the cutting tool 100 to a holder 220 of the actuator 210. The shank 120, for example, may be sized and shaped to be accepted by an opening of the holder 220. The shank 120, in various examples, may have a round, square, or otherwise polygonal cross-section, and/or may be stepped. The holder 220 (e.g., a chuck) may be configured to releasably accept the shank 120 of the cutting tool 100. Generally, the actuator 210 is configured to rotate or rotate and orbit the cutting tool 100 and/or urge the cutting tool 100 into the stack 230 to remove material (e.g., form and/or enlarge an opening) in the stack 230. In various examples, the actuator 210 may be configured as an axial drill, or an orbital drill, among others.

Coatings, as referred to herein (e.g., first coating 116 and second coating 118) may comprise one or more different materials than an underlying substrate (e.g., exterior surface of the first portion 112 and/or the second portion 114) to which the coatings are applied. In some examples, the first portion 112 and/or the second portion 114 of the cutting tool 100 may be made of a carbide material used as a substrate to which one or more coatings are applied. For example, the first coating 116 and second coating 118 may be comprised of materials selected to provide improved durability, wear, reliability, and/or precision for cutting operations. The first coating 116 and/or the second coating 118 may be applied having a generally uniform thickness. The first coating 116 and/or the second coating 118 may be applied, for example, using a chemical vapor deposition (CVD) process. In another example, the first coating 116 and/or the second coating 118 may be applied using a physical vapor deposition (PVD) process, such as sputter deposition. The particular composition of the coatings, the thickness of the coatings, and the technique(s) used to apply the coatings may be determined based on the particular requirements of a given application, including the material(s) to be processed by the cutting tool 100.

As illustrated, e.g., in FIG. 2, the cutting tool 100 may include a body 110 that includes the first portion 112, the second portion 114, and the shank 120. The shank 120 may be disposed proximate a shank end 206 and the first portion 112 may be disposed proximate a cutting end 204 of the tool 100, with the second portion 114 disposed between the shank 120 and the first portion 112, as described above. In the example depicted in FIG. 2, the shank 120 is immediately adjacent to (contiguous with) the second portion 114, and the second portion 114 is immediately adjacent to (contiguous with) the first portion 112; however, in other examples, the aforementioned adjacencies may not exist and/or additional portions may be present. As described herein, the first portion 112 and second portion 114 include portions configured for cutting, or cutting portions. In some examples, the first portion 112 and/or the second portion 114 may include at least one portion not configured for cutting. For example, as illustrated in FIG. 2, the second portion 114 of the body 110 of the cutting tool 100 may include a non-cutting portion 115, proximate the shank end 206. Non-cutting portions, such as the non-cutting portion 115, may be provided with a coating (e.g., the first coating 116 and/or the second coating 118) in some examples, and not provided with a coating in other examples.

Figure 5:
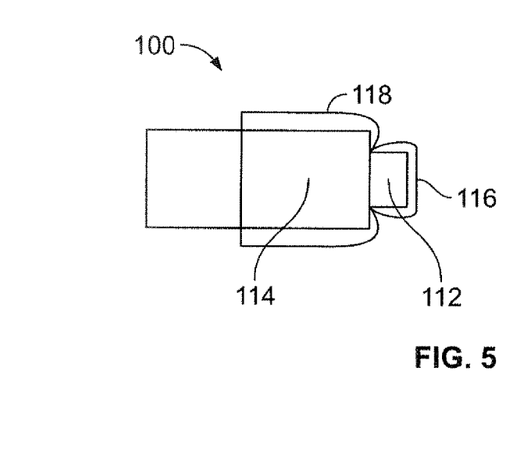
FIGS. 5-7 are schematic sectional views illustrating examples of the cutting tool of FIG. 1 having different coating configurations.
Figure 6:
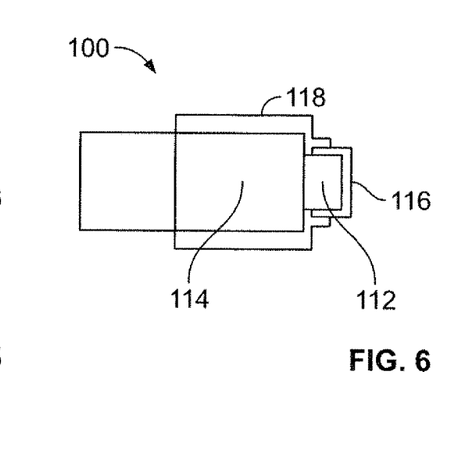
Figure 7:
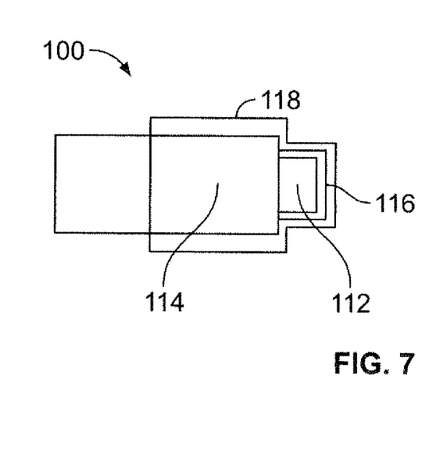

Referring, e.g., to FIGS. 5-7, in one aspect of the disclosure, which may include at least a portion of the subject matter of any of the preceding and/or following examples and aspects, the first coating 116 substantially completely covers the first portion 112 of the cutting tool 100 and the second coating 118 substantially completely covers the second portion 114 of the tool. In other examples, the first coating 116 may not completely cover the first portion 112 and/or the second coating 118 may not completely cover the second portion 114. For example, as illustrated in FIG. 2, the depicted second portion 114 includes a non-cutting portion 115 to which the second coating 118 is not applied.

Referring, e.g., to FIGS. 2 and 5-7, in one aspect of the disclosure, which may include at least a portion of the subject matter of any of the preceding and/or following examples and aspects, the first coating 116 is different than the second coating 118 of the cutting tool 100. For example, the first coating 116 may include a first material that is not suitable for use in cutting a given material and/or layer in the stack 230, while the second coating 118 may include a different, second material that is suitable for use in cutting the given material and/or layer in the stack 230. As used herein, a coating material is suitable for cutting a stack material if the coating material is commercially acceptable for normal use as intended for cutting the stack material, for example, if the coating material may be used to cut the stack material with a reasonable or practical level of wear, performance, and reactivity, as understood by those skilled in the art. As used herein, a coating material is unsuitable for cutting a stack material if use of the coating material to cut the stack material is impractical or overly expensive, as understood by those skilled in the art, due to insufficient cutting properties and/or undesirable interactions between the materials, for example, fouling or contamination. For example, a coating material that wears faster than those skilled in the art would anticipate when used with a given stack material, or does not provide adequate performance (e.g., has a lower than necessary material removal rate or produces an inferior surface finish), is not acceptable for use with the given stack material. As another example, if a coating material chemically reacts with a stack material to foul or damage the coating material and/or the stack material, the coating material is not suitable for use with the stack material.

In one example, the first coating 116 of the tool 100 is suitable for use in cutting a first (one) layer of the stack 230, but is not suitable for use in cutting a second (another) layer of the stack 230, with the second coating 118 being suitable for use in cutting the second layer of the stack 230. In this example, the pilot opening 240 may be provided in the second layer of the stack 230 and sized such that the first coating 116 does not contact the second layer of the stack 230, with the second coating 118 instead contacting the second layer of the stack 230 during a cutting process to form an opening in the second layer of the stack 230.

For example, as shown, e.g., in FIG. 2, the stack 230 includes a ferrous layer 232, a composite layer 234, and a non-ferrous layer 236. The ferrous layer 232 may be formed of or include a material including iron—for example, an iron alloy, such as a carbon steel. The composite layer 234 may be formed of or include a composite material, such as carbon fiber reinforced plastic (CFRP). The non-ferrous layer 236 may be formed of or include, e.g., a non-ferrous metal or alloy (such as titanium or aluminum) or fiberglass, among others. With reference to the example discussed above, the composite layer 234 may be an example of a first layer, which the first coating 116 is suitable for cutting, and the ferrous layer 232 may be an example of a second layer, which the first coating 116 is not suitable for cutting. As illustrated in FIG. 2, the pilot-opening dimension 242 of the pilot opening 240 is sized to provide a clearance for passage of the first portion 112, such that the first coating 116 does not contact the ferrous layer 232 when the actuator 210 is operated to remove material (e.g., form an opening) in the stack 230. The pilot opening 240 and second portion 114 are sized or selected so that the second coating 118 may contact the ferrous layer 232 to remove material from the ferrous layer 232 (e.g., to enlarge the pilot opening 240 and/or provide a desired uniformity or finish of the pilot opening 240).

Thus, in various examples, the first portion 112 of the cutting tool 100 and the pilot opening 240 may be sized and configured to prevent the first coating 116 of the cutting tool from contacting a material with which the first coating 116 is not suitable for use, with the second portion 114 (and the second coating 118) used to cut the material with which the first coating 116 is not suitable for use. While the pilot opening 240 in FIG. 2 is depicted as extending through only the ferrous layer 232, in other examples the pilot opening 240 may extend through one or more other layers (e.g., the non-ferrous layer 236), and/or additional pilot openings may be present in other layers. Additionally or alternatively to the first coating 116 and the second coating 118 including different materials, the first coating 116 may be applied to the cutting tool 100 using a different technique than that used to apply the second coating 118. For example, CVD may be used to apply the first coating 116, and PVD may be used to apply the second coating 118.

Referring, e.g., to FIG. 2, in one aspect of the disclosure, which may include at least a portion of the subject matter of any of the preceding and/or following examples and aspects, the first coating 116 of the cutting tool 100 includes a diamond material. The diamond material may be, for example, a diamond coating applied using a CVD technique, and may be applied to the first portion 112 of the cutting tool 100. Metals or alloys, for example, may be used as a substrate to which a diamond coating is applied. Certain metals or alloys may require a pre-treatment before application of diamond coatings. Diamond coatings may be used to cut materials, such as CFRP, fiberglass, titanium, and aluminum, but may not be suitable for use in cutting steels or other ferrous materials. Further, it may be noted that diamond coatings may be relatively intolerant of surface contaminants and imperfections on the substrate, and insufficient adhesion of the coating(s) to the substrate may result from such surface contaminants and imperfections, and/or use of an inappropriate substrate. In various examples, a diamond coating may be relatively thin, for example about 0.0002 inches (about 0.005 mm). Thicker coatings may be employed in other examples. In various examples, particle sizes of the coatings may be about 0.00008 inches (about 2 micrometers). Larger particle sizes may be utilized in other examples.

Generally, diamond coatings provide improved hardness, and improved wear and abrasion resistance relative to uncoated cutting surfaces (e.g., carbide surfaces) or other coatings (e.g., Aluminum Chromium Nitride (AlCrN) coatings). Diamond coatings, however, may be more expensive than other coatings. Further, diamond coatings may be incompatible or unsuitable for cutting certain materials, such as ferrous materials. Fouling and/or contamination of a diamond-coated cutting surface and/or a ferrous material being cut may result from the use of a diamond coated cutting surface for cutting a ferrous material. For example, friction and heat from cutting ferrous materials may result in a chemical reaction that causes carbon in the diamond coating to diffuse into the ferrous material, resulting in contamination or fouling and/or accelerated or premature wear or failure of the coating.

In one aspect of the disclosure, which may include at least a portion of the subject matter of any of the preceding and/or following examples and aspects, the second coating 118 of the cutting tool 100 includes an AlCrN material. AlCrN coatings may be applied, for example, using a PVD process. An AlCrN coating may provide greater hardness and wear resistance than an uncoated surface (e.g., carbide), but lower hardness and wear resistance than a diamond coating. AlCrN coatings may be suitable for cutting both ferrous and other (e.g., composite) materials, and thus may be applied to the first portion 112 and the second portion 114 when the cutting tool 100 is used to form an opening in both ferrous and non-ferrous layers. For example, a PVD AlCrN coating may be suitable for cutting steels or other ferrous materials, as well as CFRP, fiberglass, titanium, and aluminum. Thus, in some examples, the first coating 116 may not be suitable for cutting a material which the second coating 118 is suitable for cutting. While the AlCrN coating may be generally suitable for cutting CFRP, those skilled in the art will appreciate that diamond coatings have wear characteristics preferable to those of AlCrN for use with CFRP. In various examples, one or more different coatings may be employed alternatively or additionally to a diamond coating and/or an AlCrN coating.

Thus, where the first coating 116 of the cutting tool 100 comprises a diamond material and the stack 230 comprises at least one layer including a ferrous material, the cutting tool 100 and stack 230 should be configured so that, during the processing of the stack 230 with the cutting tool 100, only the second coating 118, suitable for cutting ferrous materials, contacts the ferrous material, and the first coating 116 does not contact ferrous material. For example, as illustrated, e.g., in FIG. 2, the first coating 116 may be limited to the first portion 112 of the cutting tool 100, the pilot opening 240 may be provided in the ferrous layer 232, and the first portion 112 and the pilot opening 240 may be sized so that the first portion 112 and the first coating 116 do not contact the ferrous material when the cutting tool 100 is urged through the stack 230. Thus, for example, the first coating 116 (e.g., a diamond coating) may be employed to take advantage of preferable wear characteristics of the first coating 116 for cutting one or more materials (e.g., CFRP) in the stack 230, while the second coating 118 (e.g., an AlCrN coating) is used for cutting another material (e.g., steel) with which the first coating 116 is not suitable for cutting, as well as other materials.

As illustrated, e.g., in FIG. 5, in one aspect of the disclosure, which may include at least a portion of the subject matter of any of the preceding and/or following examples and aspects, the second portion 114 of the tool 100 is substantially devoid of the first coating 116. For example, the second portion 114 may be masked off when the first coating 116 is applied to the cutting tool 100. As also illustrated in FIG. 5, in one aspect of the disclosure, which may include at least a portion of the subject matter of any of the preceding and/or following examples and aspects, the first portion 112 of the tool 100 is substantially devoid of the second coating 118 and the second portion 114 of the tool 100 is substantially devoid of the first coating 116.

In various examples, discussed above, the first coating 116 and/or the second coating 118 may be substantially limited to only one of the first portion 112 or the second portion 114. However, in some examples, one or more coatings may be applied to more than one of the portions.

As illustrated in FIG. 6, in one aspect of the disclosure, which may include at least a portion of the subject matter of any of the preceding and/or following examples and aspects, the first coating 116 and the second coating 118 of the cutting tool 100 at least partially overlap along the first portion 112 of the tool. As illustrated in FIGS. 6 and 7, in one aspect of the disclosure, which may include at least a portion of the subject matter of any of the preceding and/or following examples and aspects, the second coating 118 covers the first coating 116. Referring, e.g., to FIG. 7, in one aspect of the disclosure, which may include at least a portion of the subject matter of any of the preceding and/or following examples and aspects, the second coating 118 substantially completely covers the first portion 112. In some examples, the first coating 116 comprises a diamond material, and the second coating 118 comprises an AlCrN material.

Those skilled in the art will appreciate that an AlCrN coating may adhere sufficiently to a diamond material for application over a diamond coating, but a diamond material may not adhere sufficiently to an AlCrN coating for application over an AlCrN coating. Because the AlCrN material is suitable for cutting both ferrous materials and composite materials, and because the AlCrN coating may be practically or reasonably applied over a diamond coating, the second coating 118 (AlCrN) may substantially completely cover the first portion 112, to which the first coating 116 (diamond) has already been applied. As the AlCrN coating wears away, the diamond coating may be exposed and used to process composite or otherwise non-ferrous (e.g., titanium) materials. However, in some embodiments, because the diamond coating may not be practically or reasonably applied over the AlCrN coating, and because the diamond coating may not be suitable for processing ferrous materials, the diamond coating may not be applied over the second coating 118. Thus, in some embodiments where the first coating 116 and the second coating 118 overlap, the coatings may be applied to the cutting tool 100 only in a particular order based on adhesion characteristics of the coatings (e.g., the first coating 116 may be applied before the second coating 118).

Referring, e.g., to FIG. 2, in one aspect of the disclosure, which may include at least a portion of the subject matter of any of the preceding and/or following examples and aspects, the first coating 116 has a higher wear resistance than the second coating 118. For example, as also discussed above, the first coating 116 may comprise a diamond material that has a higher wear resistance than the second coating 118, which may comprise an AlCrN material. It may be noted that wear resistance may not necessarily be determined by a material's hardness. For example, even though two materials may have similar hardness, their wear resistance may be different. Those skilled in the art will appreciate that different types of wear resistance exist. One type of wear resistance is a low-stress or scratching abrasion. One method of measuring a material's resistance to scratching abrasion is a Dry Sand Rubber Wheel Test, or ASTM G65. The Dry Sand Rubber Wheel Test characterizes materials in terms of weight loss under a controlled set of laboratory conditions. Correlation to actual field conditions may be influenced by other wear parameters, such as the amount of impact, corrosion, or galling, among others; however, insight into the field performance of a material may be gained by examining the results of the Dry Sand Rubber Wheel Test against a material's chemistry and the microstructure of the material. In one aspect of the disclosure, which may include at least a portion of the subject matter of any of the preceding and/or following examples and aspects, at least a portion (e.g., the shank 120 and/or the non-cutting portion 115) of the cutting tool 100 has a lower wear resistance than the first coating 116 and the second coating 118.

As indicated above, in various examples, the cutting tool 100 may be configured so that the first coating 116 and the first portion 112 are not brought into contact with one or more layers of the stack 230 containing the pilot opening 240 (e.g., the ferrous layer 232) as the stack 230 is processed using the cutting tool 100. Referring once again to FIG. 2, in one aspect of the disclosure, which may include at least a portion of the subject matter of any of the preceding and/or following examples and aspects, the first portion 112 includes a first end surface 250 and a first side surface 252. The first side surface 252 has a maximum first side-surface diameter 254 that is smaller than the pilot-opening dimension 242. The first coating 116 substantially completely covers the first end surface 250. The second portion 114 includes a second end surface 260 and a second side surface 262. The second side surface 262 has at least one second side-surface diameter 264 that is greater than the maximum first side-surface diameter 254. The second coating 118 includes a different material than the first coating 116, and the second coating 118 covers at least a portion of the second end surface 260.

The maximum first side-surface diameter 254 and the second side-surface diameter 264 may be measured or determined to include both the underlying material or substrate of the body 110 of the cutting tool 100 and the thickness of any coating applied. In some examples, the diameter of the first portion 112 (the first side surface 252) may be substantially constant along the length of the first portion 112, such that the diameter along any portion of the length of the first portion 112 may be understood as being the maximum first side-surface diameter 254. Similarly, the diameter of the second portion 114 (the second side surface 262) may be substantially constant along the length of the second portion 114, such that the diameter along any portion of the length of the second portion 114 may be understood as being the second side-surface diameter 264. It may further be noted that while the term "diameter" is used, the cross-section of the first portion 112 and the second portion 114 need not be perfectly or continuously circular. For example, flutes, teeth, or other features may be present along the first side surface 252 and the second side surface 262.

The second side-surface diameter 264 of the cutting tool 100 may be substantially the same size as the pilot-opening dimension 242, or larger, so that the second side-surface diameter 264 may be used to remove material from one or more layers of the stack 230 containing the pilot opening 240 (e.g., the ferrous layer 232). In some examples, the second side-surface diameter 264 may be smaller than the pilot opening 240, but may still be used to remove material from the ferrous layer 232 by orbiting the cutting tool 100. Because the maximum first-side surface diameter 254 is smaller than the pilot opening 240, the first portion 112 may be urged through the stack 230 without the first coating 116 coming into contact with the ferrous layer 232. Furthermore, any movement of the first portion 112 in a direction transverse relative to the longitudinal symmetry axis 202 (e.g., due to orbiting of the cutting tool 100) may be limited to an area smaller than the pilot opening 240 to prevent contact between the first coating 116 and the ferrous layer 232.

Figure 3:
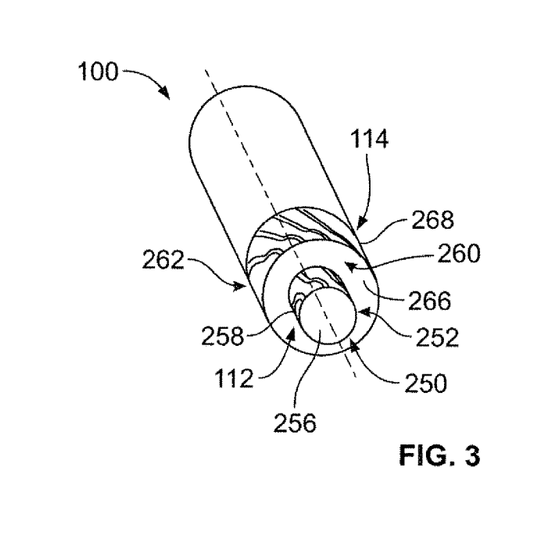
FIG. 3 is a schematic perspective view of the cutting tool of FIG. 2, according to one aspect of the disclosure.
Figure 4:
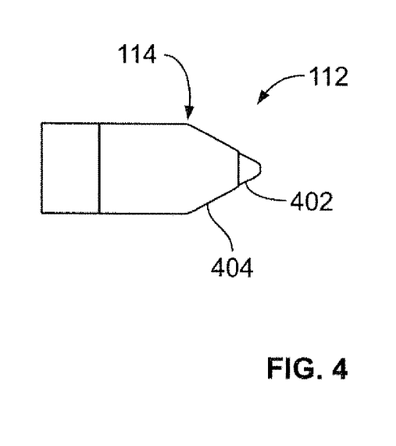
FIG. 4 is a schematic side view of the cutting tool of FIG. 1 having tapered surfaces, according to one aspect of the disclosure.

As illustrated in FIGS. 2 and 3, in one aspect of the disclosure, which may include at least a portion of the subject matter of any of the preceding and/or following examples and aspects, the second portion 114 is adjacent to the first portion 112, the first end surface 250 is substantially disc shaped, and the second end surface 260 is a substantially annular ring. Referring, e.g., to FIG. 3, in one aspect of the disclosure, which may include at least a portion of the subject matter of any of the preceding and/or following examples and aspects, the first end surface 250 includes a first end-surface cutting edge 256 and the second end surface 260 includes a second end-surface cutting edge 266. In one aspect of the disclosure, which may include at least a portion of the subject matter of any of the preceding and/or following examples and aspects, the first side surface 252 includes a first side-surface cutting edge 258 and the second side surface 262 includes a second side-surface cutting edge 268. A cutting edge of a surface, as used herein, need not necessarily occupy the entirety of a surface or be located at a boundary between two different surfaces. A cutting edge may be a portion of surface. Further, in some examples, a given surface may include more than one cutting edge. Cutting edges in various examples may be formed on a surface, at a junction of two surfaces, and/or near a junction of two surfaces.

As illustrated in FIGS. 2 and 3, the first portion 112 and/or the second portion 114 of the cutting tool 100 may be generally cylindrical in shape; however other shapes may be employed in various examples. As illustrated, e.g., in FIG. 4, in one aspect of the disclosure, which may include at least a portion of the subject matter of any of the preceding and/or following examples and aspects, at least one of the first portion 112 and the second portion 114 includes a tapered surface. For example, the first portion 112 may include a first tapered surface 402 and the second portion 114 may include a second tapered surface 404. In some examples, at least one of the first portion 112 and the second portion 114 may have a side surface that is tapered along substantially its entire length, or may have a side surface a portion of which is tapered and a portion that is not. In some examples, the first portion 112 and/or the second portion 114 may be tapered to be generally conical or frustoconical. A tapered side surface may have flutes, teeth, or other features therealong. Shapes other than conical, e.g., with different diameters along the first portion 112 and/or the second portion 114, may be employed. Accordingly, in some examples, the first portion 112 and/or the second portion 114 may include stepped portions having different diameters.

Figure 11A:
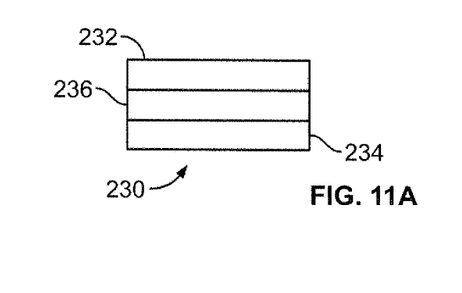
FIGS. 11a-11d are schematic sectional views illustrating the forming of openings in a stack of parts.
Figures 11B, 11D:
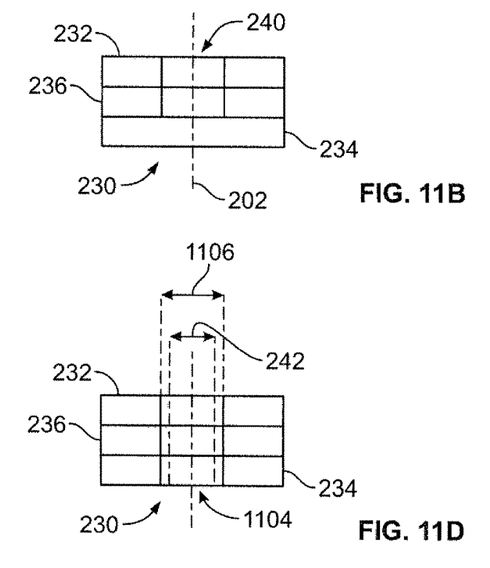
Figure 11C:
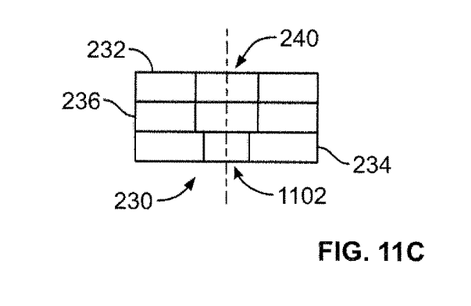
Figure 12A:
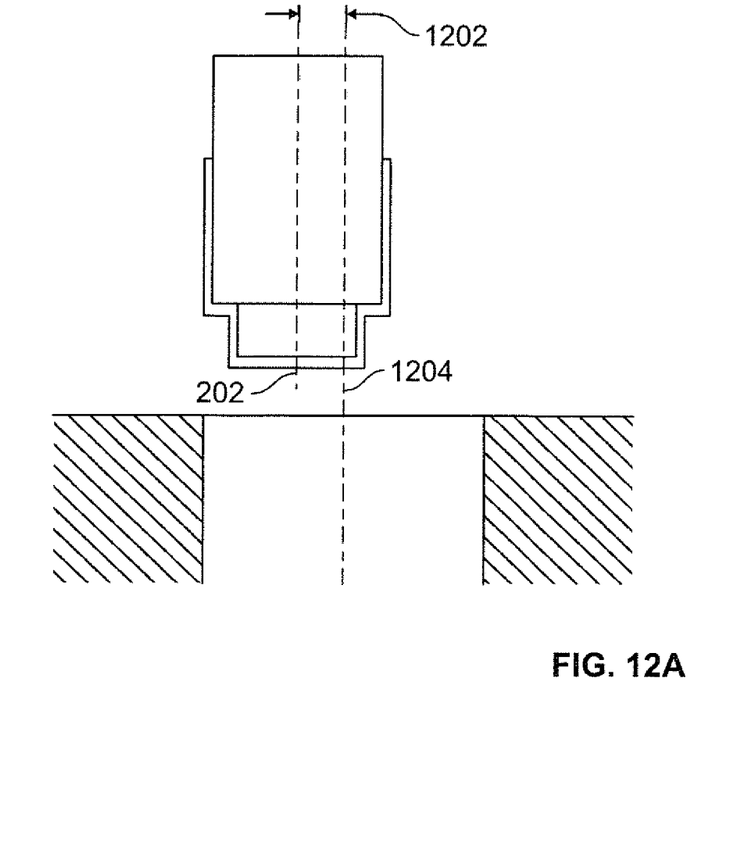
FIGS. 12a and 12b are views depicting the orbiting of the cutting tool of FIG. 2, according to one or more aspects of the disclosure.
Figure 12B:
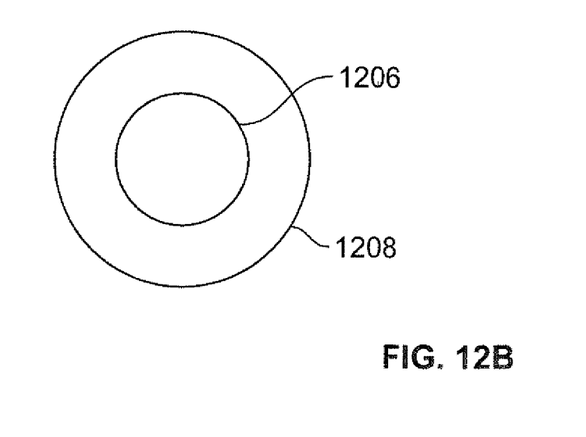
Figure 13:
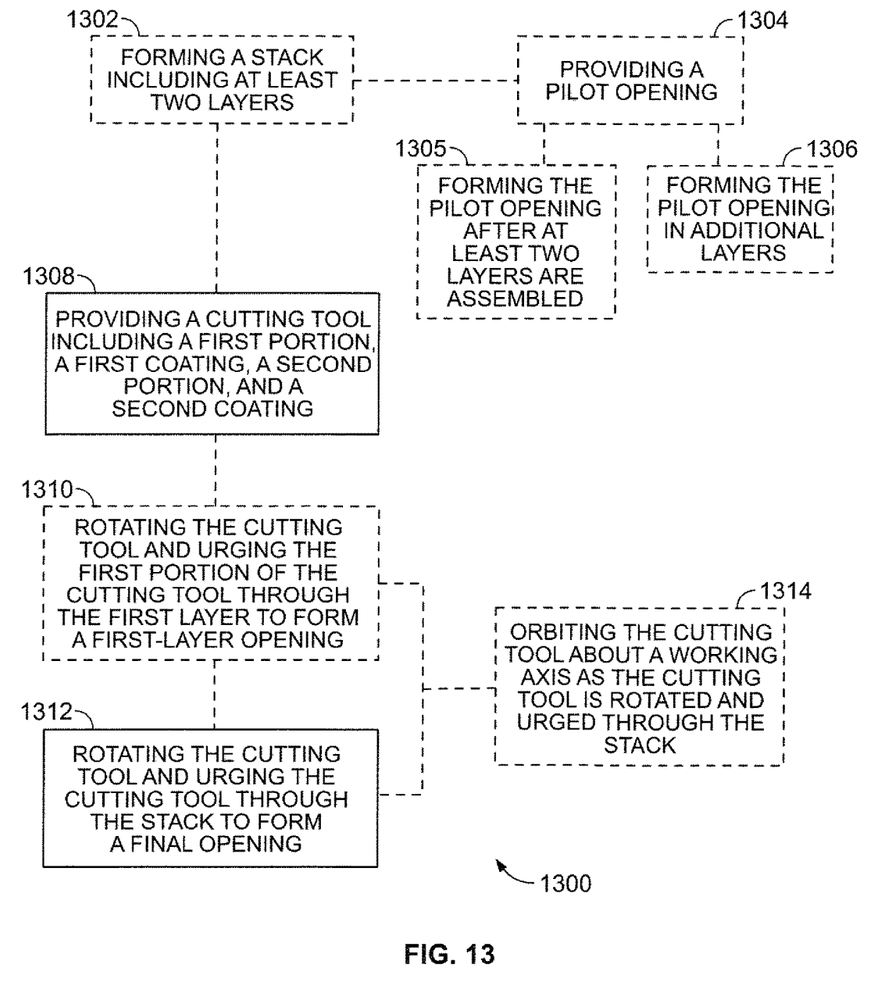
FIG. 13 is a block diagram of a method of using the cutting tool of FIG. 1 to form an opening in a stack of parts, according to one aspect of the disclosure.

Referring generally to FIGS. 1-12 and in particular to FIG. 13, one example of the present disclosure relates to a method 1300 of processing the stack 230 that includes at least two layers (e.g., the ferrous layer 232 and the composite layer 234). The method 1300 includes providing the cutting tool 100 (operation 1308). As illustrated, e.g., in FIGS. 1 and 2) the cutting tool 100 includes the shank 120, the first portion 112 which includes at least one of the first coating 116 or the first coating 116 and the second coating 118, wherein the first coating 116 at least partially covers the first portion 112, and the second portion 114 which is disposed between the shank 120 and the first portion 112, wherein the shank 120, the first portion 112, and the second portion 114 have the longitudinal symmetry axis 202, wherein the second portion 114 includes the second coating 118, and wherein the second coating 118 at least partially covers the second portion 114. Referring, to FIG. 13 and FIGS. 1-2, the method also includes rotating the cutting tool 100 about the longitudinal symmetry axis 202 and urging the cutting tool 100 through the stack 230 to form a final opening 1104 (see, e.g., FIG. 11*d*) having a final-opening diameter 1106 and extending through the at least two layers, wherein the first portion 112 is smaller than the pilot opening 240 having the pilot-opening dimension 242 and extending through at least one of the at least two layers, the final-opening diameter 1106 (see, e.g, FIG. 11*d*) is substantially equal to or larger than the pilot-opening dimension 242, and the final opening 1104 is substantially coaxial with the pilot opening 240 (operation 1312).

One or more openings (e.g., the pilot opening 240 and/or the final opening 1104) may be substantially circularly shaped. In other examples, openings having other shapes (e.g., ovals or slots, among others) may be employed. The pilot opening 240 may pass through only one layer, or may pass through more than one layer. Further, in some examples, more than one pilot opening (e.g., a first pilot opening in a first layer and a second pilot opening in a second layer) may be present. For example, the second pilot opening may be in a layer that is not adjacent to the layer in which the first pilot opening is positioned, and/or the second pilot opening may be a different size than the first pilot opening. The first and second pilot openings may be aligned.

The disclosure and drawing figure(s) describing the operations of the methods) set forth herein should not be interpreted as necessarily determining a sequence of such operations. Rather, although one illustrative order is indicated, it is to be understood that the sequence of the operations may be modified when appropriate. Additionally, in some aspects of the disclosure, not all operations described herein need be performed.

Referring, e.g., to FIG. 11a, in one aspect of the disclosure, which may include at least a portion of the subject matter of any of the preceding and/or following examples and aspects, when practicing the method 1300, the at least two layers (e.g., the ferrous layer 232 and the composite layer 234) of the stack 230 comprise the first layer (e.g., the ferrous layer 232) and the second layer (e.g., the composite layer 234), and wherein the first layer (e.g., the ferrous layer 232) comprises a different material than the second layer (e.g., the composite layer 234). As discussed herein, one of the layers may include a material which one of the first coating 116 or the second coating 118 of the tool 100 are not suitable to cut. For example, the first coating 116 may comprise a diamond material that is not suitable for cutting the ferrous layer 232.

Figure 8:
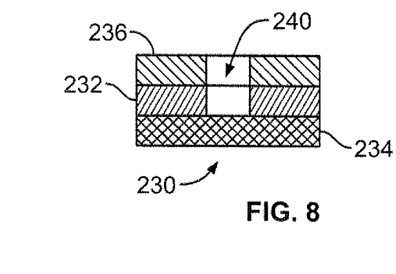
FIGS. 8-10 are schematic sectional views illustrating different pilot-opening arrangements.
Figure 9:
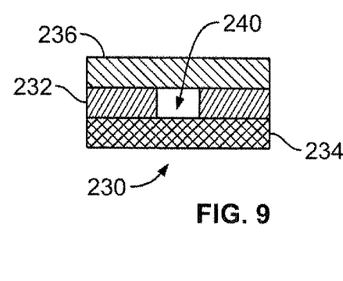
Figure 10:
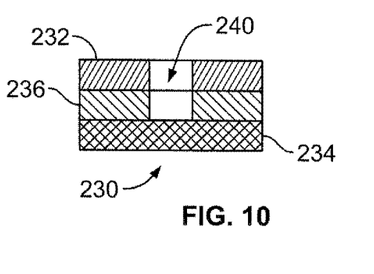

Referring, e.g., to FIG. 2, in one aspect of the disclosure, which may include at least a portion of the subject matter of any of the preceding and/or following examples and aspects, the at least two layers of the stack 230 include the composite layer 234 comprising a composite material and the ferrous layer 232 comprising a ferrous material, wherein the pilot opening 240 extends through at least the ferrous layer 232, and wherein the first coating 116 does not contact the ferrous material of the ferrous layer 232 when the cutting tool 100 is urged through the stack 230. Thus, for example, if the first coating 116 (e.g., a diamond coating) of the tool 100 is not suitable for cutting the ferrous layer 232, the first coating 116 may be prevented from cutting or other contact with the ferrous material of the ferrous layer 232. In one aspect of the disclosure (see, e.g., FIGS. 8-10), the pilot opening 240 extends through the ferrous layer 232 and does not extend through the composite layer 234. In one aspect of the disclosure, which may include at least a portion of the subject matter of any of the preceding and/or following examples and aspects, the final opening 1104 is formed in the composite layer 234 before the final opening 1104 is formed in the ferrous layer 232. For example, as shown in FIGS. 8-10, if the cutting tool 100 is urged into the stack 230 from the bottom of the stack 230, the final opening 1104 (see, e.g., FIG. 11d) may be formed in the composite layer 234 before the ferrous layer 232. In one aspect of the disclosure, which may include at least a portion of the subject matter of any of the preceding and/or following examples and aspects, the final opening 1104 is formed in the ferrous layer 232 before the final opening 1104 is formed in the composite layer 234. For example, as seen in FIGS. 8-10, if the cutting tool 100 is urged into the stack 230 from the top of the stack 230 as seen in FIGS. 8-10, the final opening 1104 may be formed in the ferrous layer 232 before the composite layer 234.

Referring, e.g., to FIGS. 2 and 8-10, in one aspect of the disclosure, which may include at least a portion of the subject matter of any of the preceding and/or following examples and aspects, the at least two layers include the composite layer 234 comprising a composite material, the ferrous layer 232 comprising a ferrous material, and at least an additional layer (e.g., non-ferrous layer 236), wherein the pilot opening 240 extends through at least the ferrous layer 232 and does not extend through the composite layer 234. In FIGS. 8-10, examples of the stack 230 are shown in which the pilot opening 240 extends through the ferrous layer 232 and not the composite layer 234. The pilot opening 240 may extend only through the ferrous layer 232, or may also extend through one or more other layers. For example, in FIG. 8 and in FIG. 10, the pilot opening 240 extends through the ferrous layer 232 and the non-ferrous layer 236, but not through the composite layer 234. In FIG. 9, the pilot opening 240 extends through the ferrous layer 232 only. In some examples, the pilot opening 240 may be exposed (e.g., pass through an external layer of the stack 230) as shown in FIGS. 8 and 10. In other examples, the pilot opening 240 may be concealed (e.g., pass through only one or more internal layers) as shown in FIG. 9. It may be noted that, in examples where the pilot opening 240 is concealed, the stack 230 may be held in a predetermined position as the cutting tool 100 is urged into the stack 230 and/or an external layer may include a marking or guide corresponding to the position of the pilot opening 240 to assist in aligning the pilot opening 240 and the cutting tool 100.

With the pilot opening 240 extending through the ferrous layer 232 but not the composite layer 234, the first coating 116 (e.g., a diamond coating) may be advantageously employed to remove composite material that may wear more quickly through the second coating 118 than through the first coating 116, while the first coating 116 is prevented from cutting or otherwise contacting the ferrous layer 232. As discussed herein, various portions of the cutting tool 100 may be provided with different coatings to improve the performance and/or service life of the cutting tool 100, while avoiding interactions of materials and coatings that may result in fouling, contamination, or other drawbacks. Thus, by covering specific parts of the cutting tool 100 with one type of coating (e.g., a diamond coating) and other parts with a different type of coating (e.g., a wear resistant PVD coating such as AlCrN), a hybrid-coated cutter may be provided to form openings in complex stacks (e.g., stacks comprising layers of different materials such as composite layers and ferrous layers), with the cutting tool 100 having a varying amount of targeted wear resistance at different locations of the cutting tool 100. Use of the cutting tool 100 may provide, for example, reduced assembly costs and/or increased productivity and/or quality. It may be noted that the various stacks depicted in FIGS. 8-10 are provided by way of example for illustrative purposes and not by way of limitation. Different numbers, types, or arrangements of layers in stacks may be employed in various examples.

Not only may the placement (e.g., location) of the pilot opening 240 vary within the stack 230, but the timing of providing the pilot opening 240, for example, relative to the assembly of one or more layers to form the stack 230, may vary in different examples. In one aspect of the disclosure, which may include at least a portion of the subject matter of any of the preceding and/or following examples and aspects, the method 1300 also includes providing the pilot opening (operation 1304) before the at least two layers (e.g., ferrous layer 232 and composite layer 234) are assembled to form the stack 230 (operation 1302). For example, in some examples, the ferrous layer 232 may be provided with the pilot opening 240 already formed in the ferrous layer 232 before the ferrous layer 232 and composite layer 234 (and, in some examples, additional layers) are joined to form the stack 230. Alternatively, in one aspect of the disclosure, which may include at least a portion of the subject matter of any of the preceding and/or following examples and aspects, the method 1300 also includes forming the pilot opening (operation 1305) after the at least two layers (e.g., the ferrous layer 232 and the composite layer 234) are assembled to form the stack 230 (operation 1302). For example, the ferrous layer 232 (with the pilot opening 240 yet to be formed therein) and the composite layer 234 (and, in some examples, additional layers) may be joined to form the stack 230, with the pilot opening 240 formed after the layers are joined (e.g., by drilling the stack 230 to a predetermined depth). In some examples, the pilot opening 240 may also be formed (operation 1306) in additional layers (e.g., non-ferrous layer 236) either before or after the stack 230 is assembled.

FIGS. 11a-11d illustrate one example of the formation of the final opening 1104 in the stack 230. As shown in FIG. 11a, the stack 230 is provided (operation 1302) including the ferrous layer 232 on one side of the stack 230 and the composite layer 234 on the opposite side of the stack 230, with the non-ferrous layer 236 interposed between the ferrous layer 232 and the composite layer 234. In other examples, different or additional layers may be employed, and/or the particular order or orientation of layers may vary. As illustrated in FIG. 11a, in the example, the stack 230 is assembled before the pilot opening 240 is formed. In various other examples, for instance where the pilot opening 240 is provided only in one or more internal layers (see, e.g., FIG. 9), the pilot opening 240 may be created before assembling the layers to form the stack 230.

As shown in FIG. 11b, in one example, the pilot opening 240 is formed in the ferrous layer 232 (operation 1304) and in the non-ferrous layer 236 (operation 1306). The pilot opening 240 may be formed having a depth extending through the ferrous layer 232 and the non-ferrous layer 236, but not through the composite layer 234. In other examples, the pilot opening 240 may be formed through the ferrous layer 232 but not the non-ferrous layer 236. With the pilot opening 240 formed, the cutting tool 100 may be urged through the stack 230 to form the final opening 1104.

Referring to, e.g., FIGS. 2, 3, 11c, and 13, as the cutting tool 100 is rotated and urged through the stack 230, material is removed. For example, the cutting tool 100 is urged through the stack 230 from the top of the stack. The first portion 112 of the cutting tool 100 is sized to pass through the pilot opening 240 without contacting the ferrous layer 232 or the non-ferrous layer 236, through which the pilot opening 240 extends. When the first portion 112 encounters the composite layer 234, the first end-surface cutting edge 256 contacts the composite layer 234 and removes material from the composite layer 234 to form a first-layer opening 1102 (operation 1310). In the example, the first-layer opening 1102 is smaller than the pilot opening 240, thereby preventing contact between the first coating 116 and the layer(s) of the stack 230 through which the pilot opening 240 passes. Thus, the first coating 116 may comprise a diamond material which is used to remove composite material without having the diamond material contact and chemically react with the ferrous layer 232.

Referring, e.g., to FIGS. 2, 3, 11d, and 13, as the cutting tool 100 is rotated and further urged through the stack 230, the second portion 114 of the cutting tool contacts the various layers of the stack, removing material and forming the final opening 1104 (operation 1312). In the example illustrated in FIG. 11d, the final opening 1104 has a final opening diameter 1106 that is larger than the pilot-opening dimension 242. In other examples, the final opening diameter 1106 and the pilot-opening dimension 242 may be substantially the same size. In FIGS. 11c and 11d, the openings formed by the first portion 112 and the second portion 114 of the cutting tool 100 are depicted as being formed at separate times for clarity of illustration; however, it should be noted that the second portion 114 and first portion 112 may remove material from layers concurrently or simultaneously in various examples (e.g., the second portion 114 forms the final opening in the ferrous layer 232 while the first portion 112 forms the first opening in the composite layer 234). For example, the length of the first portion 112 and the thicknesses and arrangement of the layers of the stack 230 may be selected, relative to the thicknesses of the layers, to provide for formation of the first-layer opening 1102 and the final opening 1104 either at substantially same time or at different times as the cutting tool 100 is urged through the stack 230. The example depicted in FIGS. 11a-d is provided for illustrative purposes and not by way of limitation. Different numbers, types, or arrangements of layers in stacks may be employed in various examples.

Referring, e.g., to FIGS. 12a and 13, in one aspect of the disclosure, which may include at least a portion of the subject matter of any of the preceding and/or following examples and aspects, the method 1300 also includes orbiting the cutting tool 100 about a working axis 1204 as the cutting tool 100 is rotated about the longitudinal symmetry axis 202 and urged through the stack 230 (operation 1314). As used herein, the working axis 1204 is the symmetry axis of the pilot opening 240 and/or the final opening 1104 (FIG. 11d). The orbiting may be performed in conjunction with forming the final opening 1104 and/or the first-layer opening 1102. During the orbiting, the cutting tool 100 may be rotated around the longitudinal symmetry axis 202 while also being rotated about the working axis 1204. The longitudinal symmetry axis 202 and the working axis 1204 are separated by an offset distance 1202. Thus, an opening larger than the diameter of a given portion of the cutting tool 100 may be formed using the given portion of the cutting tool 100. As illustrated in FIG. 12b, a non-orbited opening 1206, formed with the cutting tool 100 using non-orbital drilling, is smaller than an orbited opening 1208, formed with the cutting tool 100 using orbital drilling. Generally, the larger the off set distance 1202 is, the larger the difference in size between the non-orbited opening 1206 and the orbited opening 1208. As one example, a final opening 1104 may have a final opening diameter 1106 that is larger than the second side-surface diameter 264 of the cutting tool 100, used to form the final opening 1104. As another example, a first-layer opening 1102 may be formed with a larger diameter than the maximum first side-surface diameter 254 of the cutting tool 100, used to form the first-layer opening 1102. Through the use of orbital drilling, multiple sizes and/or shapes of openings may be formed using a single size of cutting tool. The orbital movement of the cutting tool 100 may be controlled to provide a non-circular orbit so that a non-circular opening may be formed. The size of the pilot opening 240, the offset distance 1202, and the maximum first side-surface diameter 254 may be selected to prevent the first coating 116 of the cutting tool 100 from contacting one or more layers of the stack 230, such as the ferrous layer 232.

In one aspect of the disclosure (see, e.g., FIG. 11d), which may include at least a portion of the subject matter of any of the preceding and/or following examples and aspects, the final opening 1104 is formed through each layer of the stack 230. In other examples, however, the final opening 1104 may not be formed through each and every layer of the stack (e.g., the final opening 1104 may be formed as a counter bore or as a fixed-depth bore).

Figure 14:
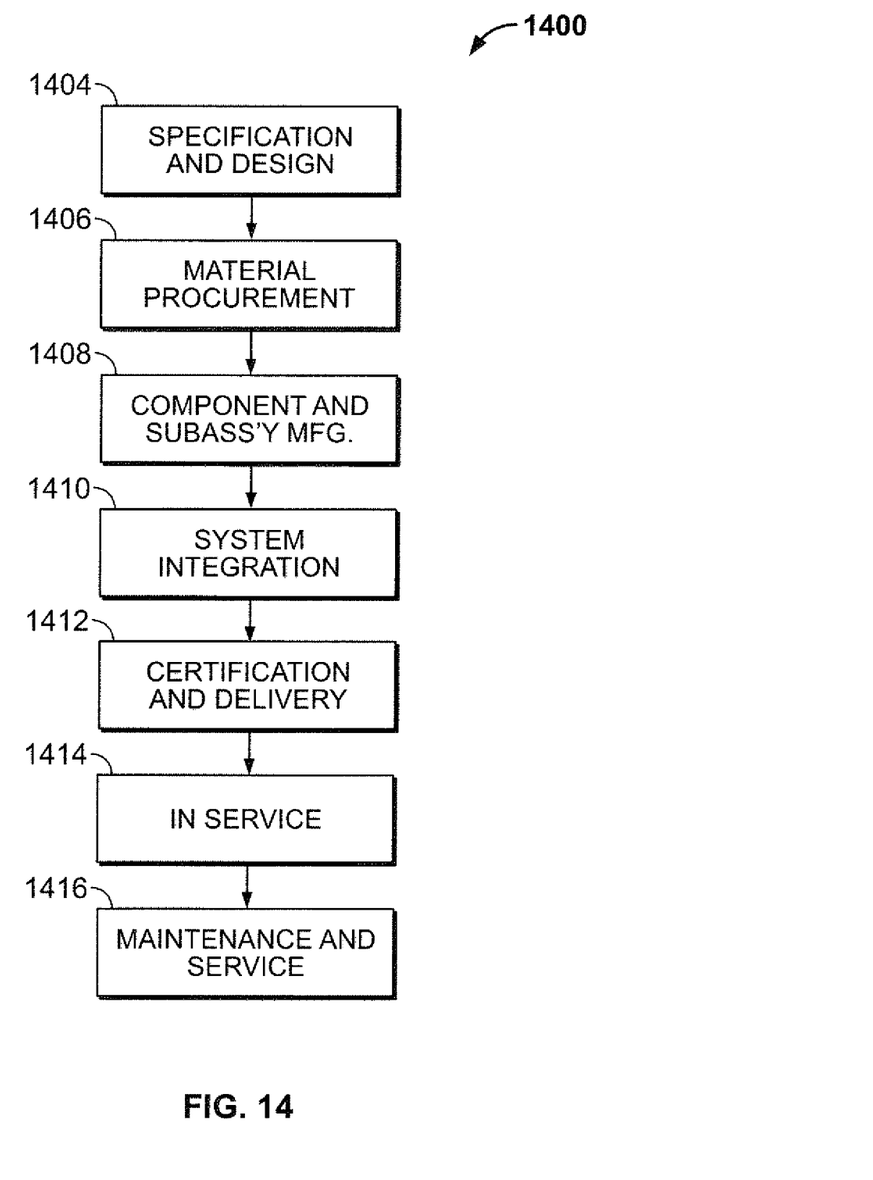
FIG. 14 is a flow diagram of aircraft production and service methodology.
Figure 15:
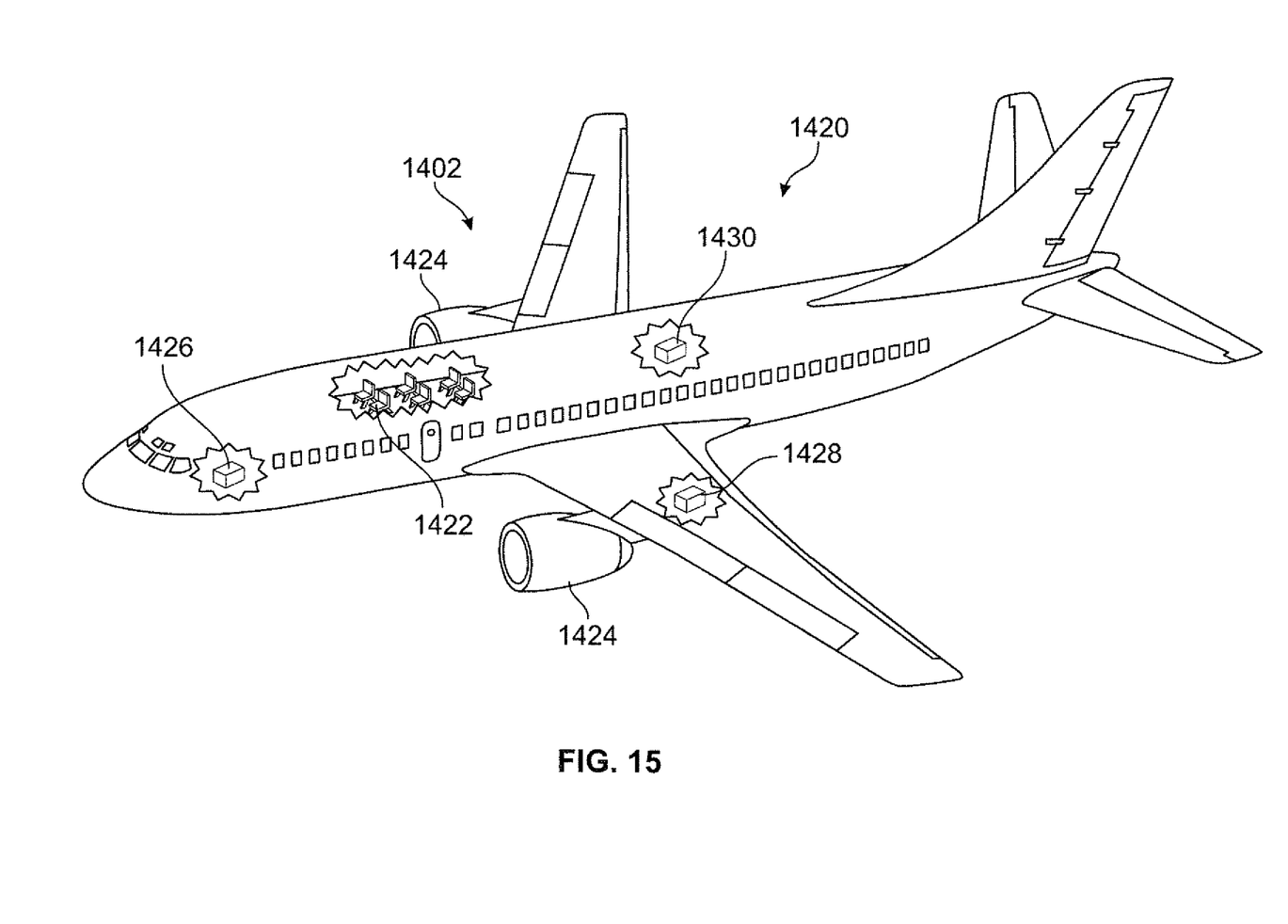
FIG. 15 is a schematic perspective view of an aircraft.

Examples of the disclosure may be described in the context of an aircraft manufacturing and service method 1400 as shown in FIG. 14 and an aircraft 1402 as shown in FIG. 15. During pre-production, illustrative method 1400 may include specification and design 1404 of the aircraft 1402 and material procurement 1406. During production, component and subassembly manufacturing 1408 and system integration 1410 take place. Thereafter, the aircraft 1402 may go through certification and delivery 1412 to be placed in service 1414. While in service by a customer, the aircraft 1402 is scheduled for routine maintenance and service 1416 (which may also include modification, reconfiguration, refurbishment, and so on).

Each of the processes of the illustrative method 1400 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 15, the aircraft 1402 produced by the illustrative method 1400 may include an airframe 1418 with a plurality of high-level systems 1420 and an interior 1422. Examples of high-level system 1420 include one or more of a propulsion system 1424, an electrical system 1426, a hydraulic system 1428, and an environmental system 1430. Any number of other systems may be included. Although an aerospace example is shown, the principles of the disclosure may be applied to other industries, such as the automotive and ship-building industries, among others.

Apparatus and methods shown or described herein may be employed during any one or more of the stages of the manufacturing and service method 1400. For example, components or subassemblies corresponding to component and subassembly manufacturing 1408 may be fabricated or manufactured in a manner similar to components or subassemblies produced while the aircraft 1402 is in service. Also, one or more aspects of the apparatus, method, or combination thereof may be utilized during the production states 1408 and 1410, for example, by substantially expediting assembly of or reducing the cost of an aircraft 1402. Similarly, one or more aspects of the apparatus or method realizations, or a combination thereof, may be utilized, for example and without limitation, while the aircraft 1402 is in service, e.g., maintenance and service 1416.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Having the benefit of the teachings presented in the foregoing description and the associated drawings, many modifications of the disclosed subject matter will become apparent to one skilled in the art to which this disclosure pertains. Therefore, it is to be understood that the disclosure is not to be limited to the specific examples and aspects provided and that modifications thereof are intended to be within the scope of the appended claims. Moreover, although the foregoing disclosure and the associated drawings describe certain illustrative combinations of elements and/or functions, it should be appreciated that different combinations of elements and/or functions may be realized without departing from the scope of the appended claims.

What is claimed is:

1. A cutting tool for forming a final opening in a stack that includes at least two layers and a pilot opening having a pilot-opening dimension and extending through at least one of the at least two layers, the cutting tool comprising:
   a shank;
   a first portion including at least one of a first coating or a second coating, wherein the first coating at least partially covers the first portion, the first portion having a first side-surface diameter that is constant, the first portion including a first end surface, the first end surface being a flat disk, the first end surface covered with the first coating; and
   a second portion interposed between the shank and the first portion along a longitudinal symmetry axis of the cutting tool, wherein the first portion and the second portion do not overlap along the longitudinal symmetry axis, wherein the second portion is contiguous with the first portion and the shank, wherein the second portion includes the second coating, and wherein the second coating at least partially covers the second portion, wherein all of the second portion has a second side-surface diameter that is constant and that is different from the first side-surface diameter.

2. The cutting tool of claim 1, wherein:
   the first portion further includes a first side surface, the first side surface having a maximum first side-surface diameter that is smaller than the pilot-opening dimension;
   the second portion includes a second end surface and a second side surface, the second side surface having at least one second side-surface diameter that is greater than the maximum first side-surface diameter; and
   the second coating includes a different material than the first coating, the second coating covering at least a portion of the second end surface.

3. The cutting tool of claim 2, wherein the second portion is adjacent to the first portion, and wherein the second end surface is a substantially annular ring.

4. The cutting tool of claim 3, wherein the first end surface includes a first end-surface cutting edge and the second end surface includes a second end-surface cutting edge.

5. The cutting tool of claim 1, wherein the first coating has a higher wear resistance than the second coating.

6. The cutting tool of claim 1, wherein the first coating comprises a diamond material.

7. The cutting tool of claim 6, wherein the second coating comprises an AlCrN material.

8. The cutting tool of claim 1, wherein the second portion is substantially devoid of the first coating.

9. The cutting tool of claim 1, wherein the first coating and the second coating at least partially overlap along the first portion.

10. The cutting tool of claim 1, wherein at least one of the first portion and the second portion includes a tapered surface.

11. The cutting tool of claim 10, wherein the second coating substantially completely covers the first portion.

12. The cutting tool of claim 11, wherein the second coating covers the first coating.

13. The cutting tool of claim 1, wherein the first portion is substantially devoid of the second coating and the second portion is substantially devoid of the first coating.

14. A method of processing a stack that includes at least two layers, the method comprising:
   providing a cutting tool comprising:
      a shank;
      a first portion including at least one of a first coating or a second coating, wherein the first coating at least partially covers the first portion, the first portion having first side-surface diameter that is constant, the first portion including a first end surface, the first end surface being a flat disk, the first end surface covered with the first coating; and a second portion interposed between the shank and the first portion along a longitudinal symmetry axis of the cutting tool, wherein the first portion and the second portion do not overlap along the longitudinal symmetry axis, wherein the second portion is contiguous with the first portion and the shank wherein the second portion includes the second coating, and wherein the second coating at least partially covers the second portion, wherein all of the second portion has a second side-surface diameter that is constant and that is different from the first side-surface diameter; and rotating the cutting tool about the longitudinal symmetry axis and urging the cutting tool through the stack parallel to or perpendicular to the longitudinal symmetry axis to form a final opening having a final-opening diameter and extending through the at least two layers, wherein the first portion is smaller than a pilot opening having a pilot-opening dimension and extending through at least one of the at least two layers, the final-opening diameter is substantially equal to or larger than the pilot-opening dimension, and the final opening is substantially coaxial with the pilot opening.

15. The method of claim 14, wherein the at least two layers of the stack comprise a first layer and a second layer, and wherein the first layer comprises a different material than the second layer, wherein the first portion is used to cut the first layer and the second portion is used to cut the second layer.

16. The method of claim 14, wherein the at least two layers of the stack include a composite layer comprising a composite material and a ferrous layer comprising a ferrous material, wherein the pilot opening extends through at least the ferrous layer, and wherein the first coating does not contact the ferrous material of the ferrous layer when the cutting tool is urged through the stack.

17. The method of claim 16, wherein the pilot opening extends through the ferrous layer and does not extend through the composite layer.

18. The method of claim 14, further comprising providing the pilot opening before the at least two layers are assembled to form the stack.

19. The method of claim 14, further comprising forming the pilot opening after the at least two layers are assembled to form the stack.

20. The method of claim 14, further comprising orbiting the cutting tool about a working axis as the cutting tool is rotated and urged through the stack.

* * * * *